(12) United States Patent
Toshioka et al.

(10) Patent No.: US 9,593,610 B2
(45) Date of Patent: Mar. 14, 2017

(54) EXHAUST GAS PURIFICATION SYSTEM FOR INTERNAL COMBUSTION ENGINE

(75) Inventors: Shunsuke Toshioka, Susono (JP); Keishi Takada, Hadano (JP); Shigeki Nakayama, Gotenba (JP); Junya Nakajima, Kariya (JP); Ichiro Yamamoto, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 112 days.

(21) Appl. No.: 14/409,743

(22) PCT Filed: Jun. 20, 2012

(86) PCT No.: PCT/JP2012/065741
§ 371 (c)(1),
(2), (4) Date: Dec. 19, 2014

(87) PCT Pub. No.: WO2013/190658
PCT Pub. Date: Dec. 27, 2013

(65) Prior Publication Data
US 2015/0192047 A1    Jul. 9, 2015

(51) Int. Cl.
*B01D 50/00* (2006.01)
*F01N 3/08* (2006.01)
(Continued)

(52) U.S. Cl.
CPC ....... *F01N 3/0842* (2013.01); *B01D 53/9431* (2013.01); *B01D 53/9495* (2013.01);
(Continued)

(58) Field of Classification Search
CPC .......... F01N 3/0842; F01N 3/021; F01N 3/28; F01N 2900/1616; F01N 2900/1812; Y02T 10/24; B01D 53/9431
(Continued)

(56) References Cited

U.S. PATENT DOCUMENTS 6,981,368 B2    1/2006 Van Nieuwstadt et al.
2003/0182935 A1    10/2003 Kawai et al.
(Continued)

FOREIGN PATENT DOCUMENTS

JP    WO2010103380 A1 * 9/2000
JP    2003-293737    10/2003
(Continued)

*Primary Examiner* — Tom P Duong
(74) *Attorney, Agent, or Firm* — Finnegan, Henderson, Farabow, Garrett & Dunner, LLP (57) ABSTRACT

An object of the present invention is to provide a technique with which an amount of reducing agent adsorbed to a selective reduction type $NO_x$ catalyst provided in an exhaust passage of an internal combustion engine can be controlled to a target adsorption amount. In an exhaust gas purification system for an internal combustion engine according to the present invention, when a reducing agent adsorption amount adsorbed on a selective reduction type $NO_x$ catalyst is held at a target adsorption amount, a reducing agent supply amount supplied from a supply apparatus per unit time is controlled to an amount obtained by adding a predetermined amount to a reduction consumption amount, which is an amount of reducing agent consumed per unit time by the selective reduction type $NO_x$ catalyst for $NO_x$ reduction.

4 Claims, 8 Drawing Sheets (51) Int. Cl.
*F01N 3/20* (2006.01)
*F01N 9/00* (2006.01)
*F01N 3/021* (2006.01)
*F01N 13/00* (2010.01)
*B01D 53/94* (2006.01)

(52) U.S. Cl.
CPC ............. *F01N 3/021* (2013.01); *F01N 3/208* (2013.01); *F01N 3/2066* (2013.01); *F01N 9/00* (2013.01); *F01N 13/009* (2014.06); *F01N 2610/02* (2013.01); *F01N 2900/1616* (2013.01); *F01N 2900/1812* (2013.01); *Y02T 10/24* (2013.01); *Y02T 10/47* (2013.01)

(58) Field of Classification Search
USPC ............................ 422/168; 60/274, 276, 284
See application file for complete search history.

(56) References Cited

U.S. PATENT DOCUMENTS

| | | | |
|---|---|---|---|
| 2010/0229530 A1 | 9/2010 | Tanioka et al. | |
| 2012/0000190 A1* | 1/2012 | Hirota | F01N 3/2006 60/301 |
| 2013/0064717 A1 | 3/2013 | Masaki et al. | |

FOREIGN PATENT DOCUMENTS

| | | |
|---|---|---|
| JP | 2009-264181 | 11/2009 |
| JP | 2009-293606 | 12/2009 |
| JP | 2010-53703 | 3/2010 |
| JP | 2011-241686 | 12/2011 |
| WO | WO 2011/118095 A1 | 9/2011 |
| WO | WO 2011/124968 A1 | 10/2011 |

\* cited by examiner

EXHAUST GAS PURIFICATION SYSTEM FOR INTERNAL COMBUSTION ENGINE

TECHNICAL FIELD

The present invention relates to an exhaust gas purification system for an internal combustion engine, which includes a selective reduction type $NO_x$ catalyst that selectively reduces $NO_x$ contained in exhaust gas.

BACKGROUND ART

A selective reduction type $NO_x$ catalyst (also referred to hereafter as an SCR catalyst) that selectively reduces $NO_x$ contained in exhaust gas when a reducing agent is supplied thereto may be provided in an exhaust passage of an internal combustion engine. The reducing agent supplied to the SCR catalyst is adsorbed to the SCR catalyst. The reducing agent adsorbed on the SCR catalyst is then used to reduce the $NO_x$. Here, a ratio of an amount of $NO_x$ reduced by the SCR catalyst relative to an amount of $NO_x$ flowing into the SCR catalyst is set as a $NO_x$ purification ratio.

Patent Documents 1 and 2 describe an exhaust gas purification apparatus for an internal combustion engine including an SCR catalyst that selectively reduces the $NO_x$ contained in the exhaust gas using ammonia ($NH_3$) as the reducing agent. In the exhaust gas purification apparatus described in Patent Documents 1 and 2, ammonia is supplied to the SCR catalyst provided in the exhaust passage by adding urea water to the exhaust gas on an upstream side of the SCR catalyst.

Further, Patent Document 1 discloses a technique of adding at least a prescribed amount of urea water when an estimated value of an amount of ammonia adsorbed on the SCR catalyst is equal to or smaller than a predetermined amount, and adding a smaller amount of urea water than the prescribed amount when the estimated value exceeds the predetermined amount. Here, the predetermined amount is a threshold indicating whether or not at least a fixed $NO_x$ purification ratio can be realized and ammonia slippage from the SCR catalyst can be suppressed under all operating conditions of the internal combustion engine.

Furthermore, Patent Document 2 discloses a technique of reducing an amount of urea water supplied to the exhaust gas which increases an amount of ammonia actually adsorbed on the SCR catalyst (the estimated value of the adsorption amount) toward a target adsorption amount as the actual amount of adsorbed ammonia increases toward the target adsorption amount.

In the techniques described in Patent Documents 1 and 2, an amount of ammonia consumed for $NO_x$ reduction by the SCR catalyst is calculated on the basis of the amount of $NO_x$ flowing into the SCR catalyst and the $NO_x$ purification ratio of the $NO_x$ catalyst. Further, the amount of ammonia adsorbed on the SCR catalyst is estimated on the basis of an amount of added urea water (an ammonia supply amount) and the amount of ammonia consumed for $NO_x$ reduction.

PRIOR ART DOCUMENTS

Patent Documents

Patent Document 1: Japanese Patent Application Publication No. 2011-241686
Patent Document 2: Japanese Patent Application Publication No. 2010-053703

SUMMARY OF THE INVENTION

Problems to be Solved by the Invention

As described above, the supplied reducing agent is adsorbed to the SCR catalyst and consumed for $NO_x$ reduction. Here, when the reducing agent is supplied to the SCR catalyst such that the amount of reducing agent adsorbed on the SCR catalyst becomes excessive, an amount of reducing agent that flows out of the SCR catalyst without being adsorbed thereto, or an amount of reducing agent that is adsorbed to the SCR catalyst temporarily but is then desorbed so as to flow out from the SCR catalyst without being consumed for $NO_x$ reduction, may increase. To achieve a target $NO_x$ purification ratio while suppressing such an excessive increase in the amount of reducing agent flowing out of the SCR catalyst, the amount of reducing agent adsorbed on the SCR catalyst must be controlled to a target adsorption amount determined in accordance with the target $NO_x$ purification ratio.

The present invention has been designed in consideration of the problem described above, and an object thereof is to provide a technique with which an amount of reducing agent adsorbed on an SCR catalyst can be controlled to a target adsorption amount.

Means for Solving the Problems

An exhaust gas purification system for an internal combustion engine according to the present invention includes:
a selective reduction type $NO_x$ catalyst provided in an exhaust passage of the internal combustion engine which selectively reduces $NO_x$ contained in exhaust gas when a reducing agent is supplied thereto;
a supply apparatus that supplies the reducing agent to the selective reduction type $NO_x$ catalyst; and
a control unit which, when a reducing agent adsorption amount adsorbed on the selective reduction type $NO_x$ catalyst is held at a target adsorption amount, controls a reducing agent supply amount supplied from the supply apparatus per unit time to an amount obtained by adding a predetermined amount to a reduction consumption amount, which is an amount of the reducing agent consumed per unit time by the selective reduction type $NO_x$ catalyst for reduction of the $NO_x$.

Here, the supply apparatus includes not only an apparatus that supplies the reducing agent itself to the SCR catalyst, but also an apparatus that supplies a substance that eventually changes into the reducing agent (a reducing agent precursor).

In the exhaust gas purification system for an internal combustion engine according to the present invention, the reducing agent supplied by the supply apparatus and adsorbed to the SCR catalyst is consumed for reduction of the $NO_x$ contained in the exhaust gas. Further, when the reducing agent is supplied to the SCR catalyst in a larger amount than the amount consumed for $NO_x$ reduction, the surplus part of the reducing agent adsorbed on the SCR catalyst remains on the SCR catalyst. Furthermore, a part of the reducing agent remaining on the SCR catalyst as a surplus is desorbed from the SCR catalyst without being consumed for $NO_x$ reduction.

Hence, when the amount of reducing agent supplied by the supply apparatus per unit time is set at an identical amount to the reduction consumption amount, which is the amount of reducing agent consumed per unit time by the SCR catalyst for $NO_x$ reduction, in a condition where the reducing agent adsorption amount adsorbed on the SCR catalyst has reached the target adsorption amount, the reducing agent adsorption amount adsorbed on the SCR catalyst gradually decreases by an amount corresponding to the amount of reducing agent that is desorbed from the SCR catalyst without being consumed for $NO_x$ reduction. In other words, the amount of reducing agent adsorbed on the SCR catalyst becomes smaller than the target adsorption amount.

In the exhaust gas purification system for an internal combustion engine according to the present invention, therefore, when the reducing agent adsorption amount adsorbed on the SCR catalyst is held at the target adsorption amount, the reducing agent supply amount supplied from the supply apparatus per unit time is controlled to the amount obtained by adding the predetermined amount to the reduction consumption amount. In other words, when the reducing agent adsorption amount adsorbed on the SCR catalyst is held at the target adsorption amount, the amount of reducing agent supplied to the SCR catalyst per unit time is made larger than the reduction consumption amount.

According to the present invention, when the reducing agent adsorption amount adsorbed on the SCR catalyst is held at the target adsorption amount, the reducing agent can be supplied to the SCR catalyst in an amount corresponding not only to the amount of reducing agent that is consumed for $NO_x$ reduction, but also to the amount of reducing agent that is desorbed from the SCR catalyst without being consumed for $NO_x$ reduction. As a result, the reducing agent adsorption amount adsorbed on the SCR catalyst can be controlled to the target adsorption amount.

The exhaust gas purification system for an internal combustion engine according to the present invention may further include a desorption amount calculation unit that calculates a desorption amount, which is an amount of reducing agent, from among the reducing agent adsorbed on the SCR catalyst, that is desorbed from the SCR catalyst per unit time without being consumed for reduction of the $NO_x$. Moreover, when, in this case, the reducing agent adsorption amount adsorbed on the SCR catalyst is held at the target adsorption amount, the control unit may set the predetermined amount at an identical amount to the desorption amount calculated by the desorption amount calculation unit. In other words, when the reducing agent adsorption amount adsorbed on the SCR catalyst is held at the target adsorption amount, the amount of reducing agent supplied to the SCR catalyst per unit time may be set at a value obtained by adding the desorption amount to the reduction consumption amount.

In so doing, the reducing agent adsorption amount adsorbed on the SCR catalyst can be held at the target adsorption amount with a higher degree of precision.

Furthermore, when the exhaust gas purification system for an internal combustion engine according to the present invention also includes the desorption amount calculation unit, and the reducing agent adsorption amount adsorbed on the SCR catalyst is smaller than the target adsorption amount, the control unit may control the reducing agent supply amount supplied from the supply apparatus per unit time to an amount obtained by adding a larger amount than the desorption amount to the reduction consumption amount. Moreover, when the reducing agent adsorption amount adsorbed on the SCR catalyst is larger than the target adsorption amount, the control unit may control the reducing agent supply amount supplied from the supply apparatus per unit time to an amount obtained by adding a smaller amount than the desorption amount to the reduction consumption amount.

As a result, when the reducing agent adsorption amount adsorbed on the SCR catalyst is smaller than the target adsorption amount, the reducing agent adsorption amount can be increased toward the target adsorption amount. Further, when the reducing agent adsorption amount adsorbed on the SCR catalyst is larger than the target adsorption amount, the reducing agent adsorption amount can be reduced toward the target adsorption amount.

Here, the reducing agent desorption amount increases as a temperature of the SCR catalyst rises. Therefore, in the exhaust gas purification system for an internal combustion engine according to the present invention, when the reducing agent adsorption amount adsorbed on the SCR catalyst is held at the target adsorption amount, the control unit may set the predetermined amount larger amount as the temperature of the SCR catalyst becomes higher.

Hence, when the reducing agent adsorption amount adsorbed on the SCR catalyst is maintained, the amount of reducing agent supplied to the SCR catalyst per unit time is increased as the reducing agent desorption amount becomes larger. As a result, the reducing agent adsorption amount adsorbed on the SCR catalyst can be controlled to the target adsorption amount.

Further, when a ratio of the reducing agent supply amount supplied from the supply apparatus per unit time relative to an inflowing $NO_x$ amount, which is an amount of $NO_x$ flowing into the SCR catalyst per unit time, is set to be constant, and the inflowing $NO_x$ amount increases, the reducing agent supply amount supplied from the supply apparatus per unit time also increases. Likewise in this case, a ratio of the amount of reducing agent consumed for $NO_x$ reduction and the amount of reducing agent remaining on the SCR catalyst as a surplus relative to the entire amount of reducing agent adsorbed to the SCR catalyst per unit time remains constant. Accordingly, the amount of reducing agent remaining on the SCR catalyst as a surplus itself increases. As a result, the amount of reducing agent adsorbed on the SCR catalyst increases by a larger amount.

Therefore, in the exhaust gas purification system for an internal combustion engine according to the present invention, when the reducing agent adsorption amount adsorbed on the SCR catalyst is held at the target adsorption amount, the control unit may set the predetermined amount such that the ratio of the reducing agent supply amount supplied from the supply apparatus per unit time relative to the inflowing $NO_x$ amount decreases as the inflowing $NO_x$ amount becomes larger.

In so doing, when the reducing agent adsorption amount adsorbed on the SCR catalyst is maintained, an excessive increase in the amount of reducing agent remaining on the SCR catalyst as a surplus can be suppressed even as the inflowing $NO_x$ amount increases. As a result, the reducing agent adsorption amount adsorbed on the SCR catalyst can be controlled to the target adsorption amount.

Advantageous Effect of the Invention

According to the present invention, the amount of reducing agent adsorbed on the SCR catalyst can be controlled to the target adsorption amount.

EMBODIMENTS FOR CARRYING OUT THE INVENTION

Specific embodiments of the present invention will be described below on the basis of the drawings. Unless specified otherwise, the technical scope of the present invention is not limited to the dimensions, materials, shapes, relative arrangements, and so on of constituent components described in the embodiments.

(First Embodiment)
[Schematic Configuration of Intake/exhaust System]

Figure 1:
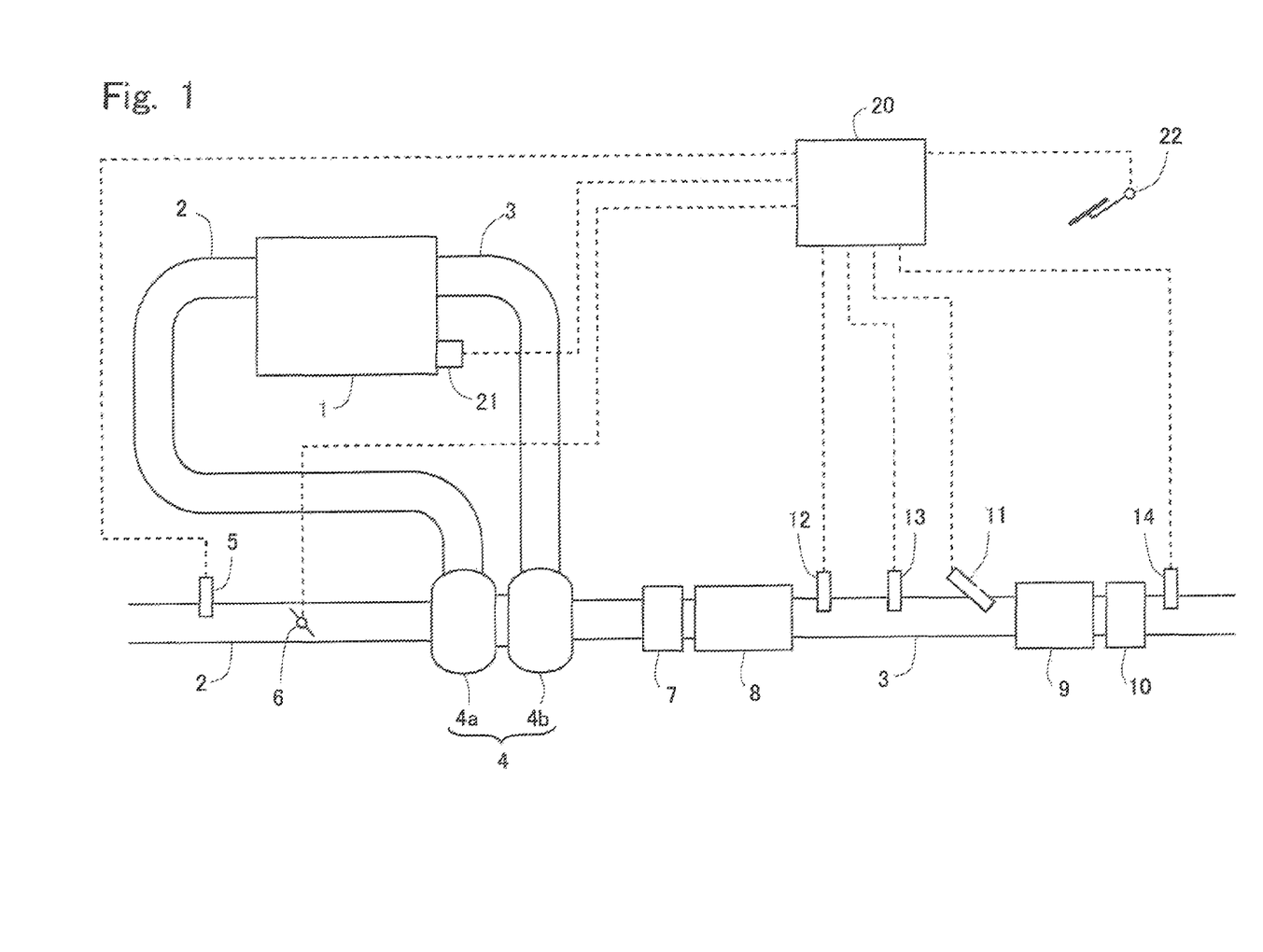
FIG. 1 is a schematic view showing a configuration of an intake/exhaust system of an internal combustion engine according to a first embodiment.

An exhaust gas purification system for an internal combustion engine according to a first embodiment of the present invention will be described below with reference to FIGS. 1 to 4. FIG. 1 is a schematic view showing a configuration of an intake/exhaust system of the internal combustion engine according to this embodiment. An internal combustion engine 1 shown in FIG. 1 is a diesel engine for driving a vehicle. However, the internal combustion engine according to the present invention is not limited to a diesel engine, and may be a gasoline engine or the like.

An intake passage 2 and an exhaust passage 3 are connected to the internal combustion engine 1. Further, a turbocharger 4 is provided in the intake/exhaust system of the internal combustion engine 1. A compressor 4a of the turbocharger 4 is provided in the intake passage 2, and a turbine 4b of the turbocharger 4 is provided in the exhaust passage 3.

An air flow meter 5 and a throttle valve 6 are provided in the intake passage 2 on an upstream side of the compressor 4a of the turbocharger 4. The air flow meter 5 detects an amount of intake air flowing through the intake passage 2. The throttle valve 6 controls the amount of air (an intake air amount) flowing through the intake passage 2.

An oxidation catalyst 7, a filter 8, an addition valve 11, a selective reduction type $NO_x$ catalyst 9 (referred to hereafter as an SCR catalyst 9), and an ammonia slip catalyst 10 are provided in the exhaust passage 3 on a downstream side of the turbine 4b of the turbocharger 4 in order from an upstream side of an exhaust gas flow direction.

The filter 8 collects particulate matter (PM) contained in the exhaust gas. The oxidation catalyst 7 may be carried on the filter 8. Further, another catalyst having an oxidation function (a three-way catalyst, for example) may be provided in place of the oxidation catalyst 7.

The SCR catalyst 9 is a catalyst that reduces $NO_x$ contained in the exhaust gas using ammonia as a reducing agent. The addition valve 11 adds ammonia to the exhaust gas in order to supply the ammonia serving as the reducing agent to the SCR catalyst 9. Note that the addition valve 11 may add any substance that eventually turns into ammonia (an ammonia precursor). For example, the addition valve 11 may add urea water. In this case, urea added by the addition valve 11 as the urea water is hydrolyzed by heat from the exhaust gas so as to form ammonia.

In this embodiment, the addition valve 11 corresponds to a supply apparatus according to the present invention. Note, however, that the substance supplied from the supply apparatus according to the present invention is not limited to ammonia (or an ammonia precursor), and may be any substance that functions as a reducing agent for reducing $NO_x$ in an SCR catalyst. Furthermore, the reducing agent supplied by the supply apparatus according to the present invention may be any of a solid, a liquid, or a gas.

The ammonia slip catalyst 10 has an oxidation function. In the ammonia slip catalyst 10, ammonia flowing out of the SCR catalyst 9 is oxidized into $N_2$. As a result, ammonia outflow to the exterior of the vehicle is suppressed.

A first $NO_x$ sensor 12 and an exhaust gas temperature sensor 13 are provided in the exhaust passage 3 on a downstream side of the filter 8 and an upstream side of the addition valve 11. A second $NO_x$ sensor 14 is provided in the exhaust passage 3 on a downstream side of the ammonia slip catalyst 10. The first and second $NO_x$ sensors 12, 14 detect a $NO_x$ concentration of the exhaust gas. The exhaust gas temperature sensor 13 detects a temperature of the exhaust gas. Note that none of these sensors is essential, and therefore the sensors may be provided as required.

An electronic control unit (ECU) 20 is provided alongside the internal combustion engine 1. The ECU 20 is a unit that controls operating conditions of the internal combustion engine 1 and so on. The air flow meter 5, the first and second $NO_x$ sensors 12, 14, and the exhaust gas temperature sensor 13 are electrically connected to the ECU 20. Further, a crank position sensor 21 and an accelerator operation amount sensor 22 are electrically connected to the ECU 20. The crank position sensor 21 detects a crank angle of the internal combustion engine 1. The accelerator operation amount sensor 22 detects an accelerator operation amount of the vehicle in which the internal combustion engine 1 is installed. Output signals from the respective sensors are input into the ECU 20.

The ECU 20 calculates an engine rotation speed of the internal combustion engine 1 on the basis of an output value from the crank position sensor 21. Further, the ECU 20 calculates an engine load of the internal combustion engine 1 on the basis of an output value from the accelerator operation amount sensor 22.

The ECU 20 estimates a temperature of the SCR catalyst 9 on the basis of a detection value from the exhaust gas temperature sensor 13. Note that the temperature of the SCR catalyst 9 can be estimated on the basis of a detection value of the exhaust gas temperature likewise when an exhaust gas temperature sensor is provided in the exhaust passage 3 on the downstream side of the SCR catalyst 9. The temperature of the SCR catalyst 9 can also be estimated on the basis of the operating conditions of the internal combustion engine 1.

The ECU 20 is capable of calculating an inflowing $NO_x$ amount, which is an amount of $NO_x$ flowing into the SCR catalyst 9 per unit time, on the basis of a detection value from the air flow meter 5 and a detection value from the first $NO_x$ sensor 12. Further, the ECU 20 is capable of calculating a $NO_x$ purification ratio of the SCR catalyst 9 on the basis of detection values from the first and second $NO_x$ sensors 12, 14.

The throttle valve 6 and the addition valve 11 are also electrically connected to the ECU 10. These apparatuses are thus controlled by the ECU 10.

[Transition of Ammonia Adsorption Amount]

As described above, the supplied ammonia is adsorbed to the SCR catalyst 9. The ammonia adsorbed on the SCR catalyst 9 is then consumed for reduction of the $NO_x$ contained in the exhaust gas. Further, a surplus part of the ammonia adsorbed on the SCR catalyst 9 remains on the SCR catalyst 9.

Furthermore, a part of the ammonia remaining on the SCR catalyst 9 as a surplus is desorbed from the SCR catalyst 9 without being consumed for $NO_x$ reduction. This desorbed ammonia flows out of the SCR catalyst 9 either as is, or after being oxidized into $NO_x$, or after being reduced from $NO_x$ into $N_2$.

Figure 2:
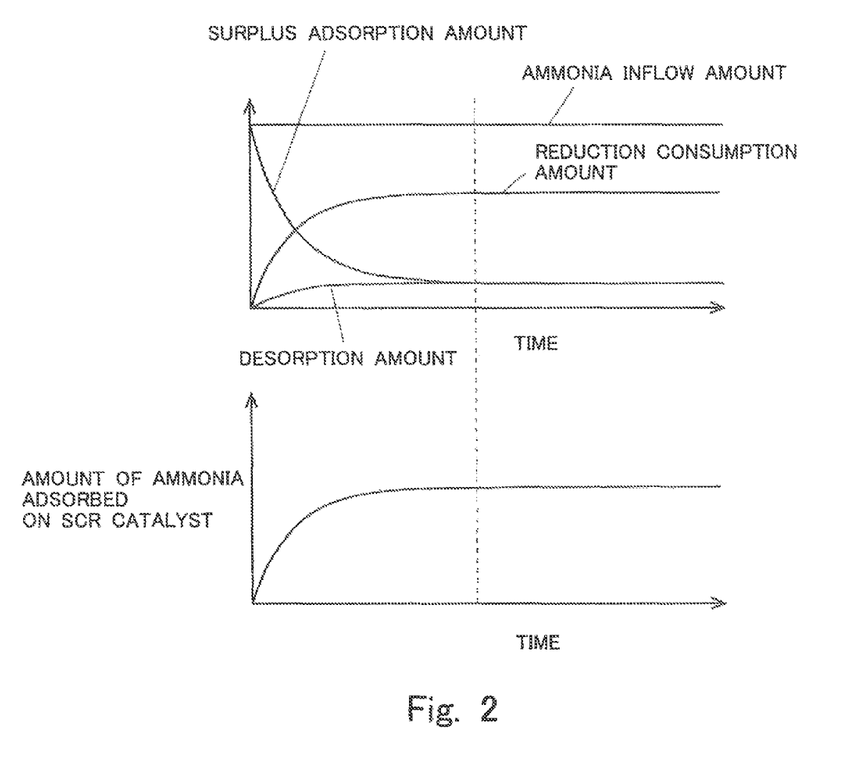
FIG. 2 is a view showing respective transitions of an amount of ammonia flowing into an SCR catalyst per unit time (an ammonia inflow amount), an amount of ammonia consumed per unit time for $NO_x$ reduction by the SCR catalyst (a reduction consumption amount), an amount of ammonia remaining on the SCR catalyst as a surplus per unit time (a surplus adsorption amount), an amount of ammonia desorbed from the SCR catalyst without being consumed for $NO_x$ reduction per unit time (a desorption amount), and an amount of ammonia adsorbed on the SCR catalyst.

FIG. 2 is a view showing respective transitions of an amount of ammonia flowing into the SCR catalyst 9 per unit time (also referred to hereafter as an ammonia inflow amount), an amount of ammonia consumed per unit time for $NO_x$ reduction by the SCR catalyst 9 (also referred to hereafter as a reduction consumption amount), an amount of ammonia remaining on the SCR catalyst 9 as a surplus per unit time (also referred to hereafter as a surplus adsorption amount), an amount of ammonia desorbed from the SCR catalyst 9 without being consumed for $NO_x$ reduction per unit time (also referred to hereafter as a desorption amount), and an amount of ammonia adsorbed on the SCR catalyst 9.

As shown in FIG. 2, when a fixed amount of ammonia is supplied continuously from a condition in which the ammonia adsorption amount on the SCR catalyst 9 is substantially zero, the reduction consumption amount gradually increases and the surplus adsorption amount gradually decreases. Further, the amount of ammonia adsorbed on the SCR catalyst 9 gradually increases, and accordingly, the desorption amount gradually increases. Following the elapse of a certain amount of time, the surplus adsorption amount and the desorption amount reach an equilibrium state. When the surplus adsorption amount and the desorption amount are in equilibrium, the reduction consumption amount remains constant thereafter. In other words, the amount of $NO_x$ reduced by the SCR catalyst 9 per unit time becomes constant. The amount of ammonia adsorbed on the SCR catalyst 9 also remains constant. Hereafter, the amount of ammonia adsorbed on the SCR catalyst 9 when the surplus adsorption amount and the desorption amount are in equilibrium may be referred to as an equilibrium adsorption amount.

[Control of Ammonia Addition Amount]

Next, control of an amount of ammonia added by the addition valve per unit time (also referred to hereafter as an ammonia addition amount) according to this embodiment will be described.

As described above, a part of the ammonia that is adsorbed on the SCR catalyst 9 but is not used immediately for $NO_x$ reduction and therefore remains on the SCR catalyst 9 as a surplus is desorbed from the SCR catalyst 9 without being consumed for $NO_x$ reduction. Here, when the ammonia addition amount is set at an identical amount to the reduction consumption amount in a condition where a certain amount of ammonia is adsorbed on the SCR catalyst, the surplus adsorption amount falls to zero. Likewise in this case, an amount of ammonia corresponding to the desorption amount is desorbed from the SCR catalyst 9. Therefore, the amount of ammonia adsorbed on the SCR catalyst 9 gradually decreases.

Hence, in this embodiment, the ammonia addition amount is controlled in consideration of the desorption amount as well as the reduction consumption amount. More specifically, the ammonia addition amount is controlled to an amount obtained by adding an adsorption amount manipulated variable to the reduction consumption amount. Then, when the amount of ammonia adsorbed on the SCR catalyst 9 reaches a target adsorption amount and the ammonia adsorption amount is held at the target adsorption amount, the adsorption amount manipulated variable is set at an identical amount to the desorption amount. In so doing, ammonia is supplied to the SCR catalyst 9 in an amount obtained by adding the desorption amount to the reduction consumption amount. As a result, the amount of ammonia adsorbed on the SCR catalyst 9 can be held at the adsorption amount at that time, or in other words the target adsorption amount.

Further, when the amount of ammonia adsorbed on the SCR catalyst 9 is smaller than the target adsorption amount, the adsorption amount manipulated variable is set at a larger amount than the desorption amount. In so doing, ammonia is supplied to the SCR catalyst 9 in an amount obtained by adding a larger amount than the desorption amount to the reduction consumption amount. As a result, the amount of ammonia adsorbed on the SCR catalyst 9 can be increased toward the target adsorption amount.

Furthermore, when the amount of ammonia adsorbed on the SCR catalyst 9 is larger than the target adsorption amount, the adsorption amount manipulated variable is set at a smaller amount than the desorption amount. In so doing, ammonia is supplied to the SCR catalyst 9 in an amount obtained by adding a smaller amount than the desorption amount to the reduction consumption amount. As a result, the amount of ammonia adsorbed on the SCR catalyst 9 can be reduced toward the target adsorption amount.

By controlling the ammonia addition amount as described above, the amount of ammonia adsorbed on the SCR catalyst 9 can be controlled to the target adsorption amount.

Figure 3:
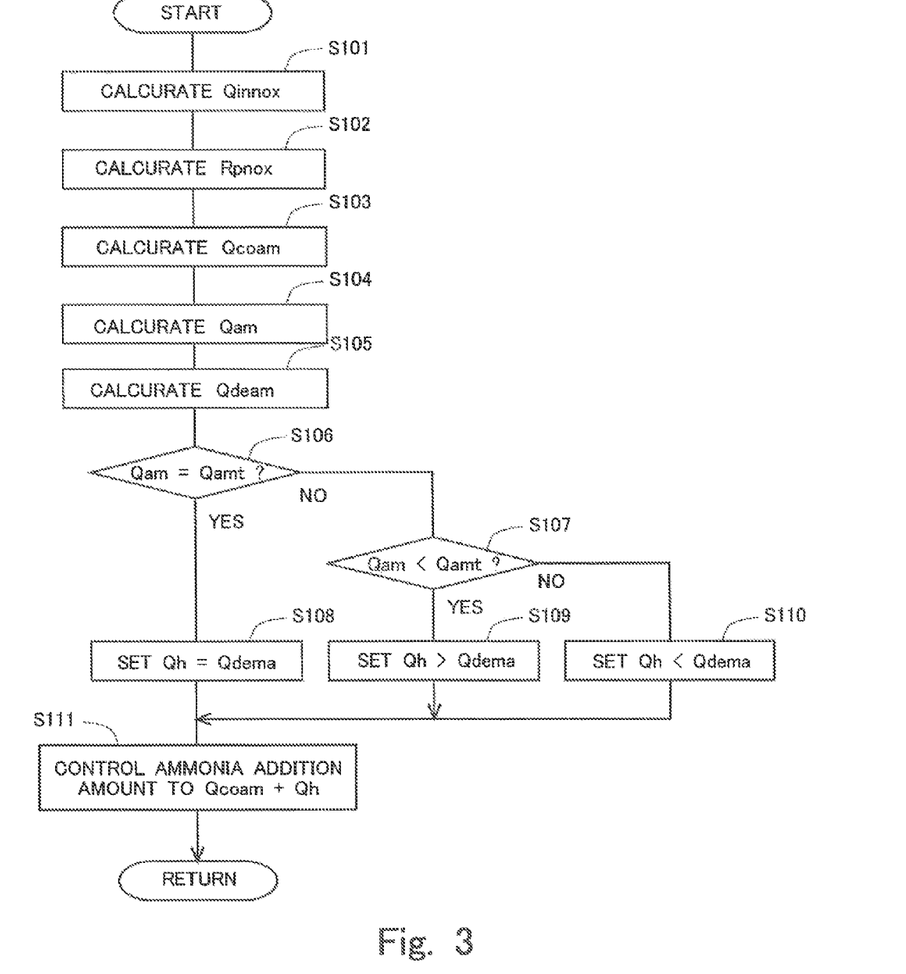
FIG. 3 is a flowchart showing a flow of ammonia addition amount control according to the first embodiment.

A flow of ammonia addition amount control according to this embodiment will be described below on the basis of FIG. 3. FIG. 3 is a flowchart showing a flow of the ammonia addition amount control according to this embodiment. This flow is stored in the ECU 20 in advance, and executed repeatedly by the ECU 20.

In this flow, first, in step S101, an inflowing $NO_x$ amount $Qinno_x$ is calculated on the basis of the detection value of the air flow meter 5 and the detection value of the first $NO_x$ sensor 12. Next, in step S102, a $NO_x$ purification ratio $Rpno_x$ of the SCR catalyst 9 is calculated on the basis of the respective detection values of the first and second $NO_x$ sensors 12, 14.

Next, in step S103, a reduction consumption amount $Qcoam$ is calculated. The amount of $NO_x$ reduced by the SCR catalyst 9 per unit time can be calculated from the inflowing $NO_x$ amount $Qinno_x$ and the $NO_x$ purification ratio $Rpno_x$. In step S103, the reduction consumption amount $Qcoam$ is calculated as the amount of ammonia consumed per unit time for $NO_x$ reduction on the basis of the $NO_x$ reduction amount per unit time.

Next, in step S104, an ammonia adsorption amount Qam of the SCR catalyst 9 is calculated. Here, the ammonia adsorption amount Qam may be calculated using any preferred conventional method.

Figure 4:
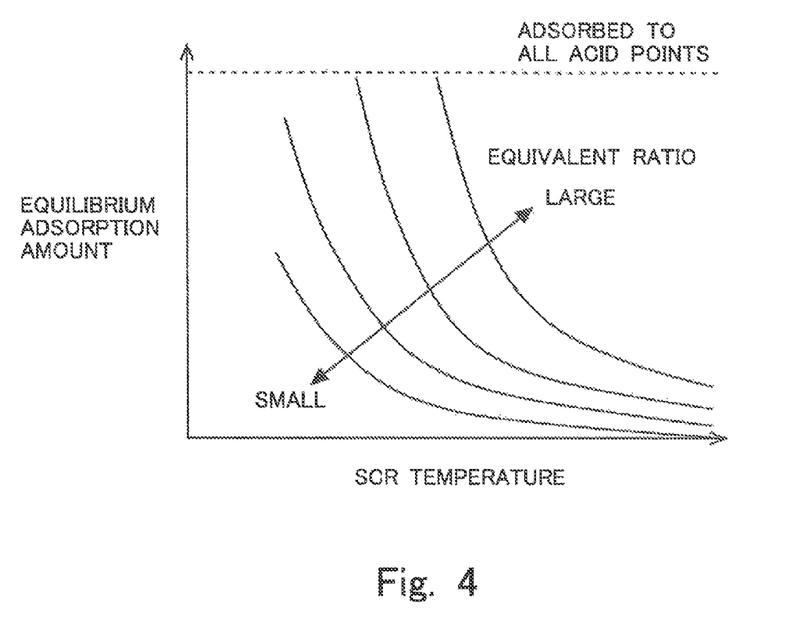
FIG. 4 is a view showing a relationship of a temperature of the SCR catalyst and an equivalent ratio ($NH_3$ supply amount/inflowing $NO_x$ amount) to an equilibrium adsorption amount.

Further, when a ratio ($NH_3$ supply amount/inflowing $NO_x$ amount) of an ammonia supply amount (an amount of ammonia added by the addition valve 11) per unit time relative to the inflowing $NO_x$ amount $Qinno_x$ is set as an equivalent ratio, the temperature of the SCR catalyst 9 and the equivalent ratio correlate with the equilibrium adsorption amount. FIG. 4 is a view showing a relationship of the temperature of the SCR catalyst 9 and the equivalent ratio to the equilibrium adsorption amount. In FIG. 4, "Adsorbed to all acid points" indicates an ammonia adsorption amount obtained when ammonia is adsorbed on all acid points serving as locations of the SCR catalyst 9 to which ammonia is adsorbed. This ammonia adsorption amount is obtained when a theoretical maximum amount of ammonia is adsorbed on the SCR catalyst 9.

As shown in FIG. 4, the equilibrium adsorption amount decreases as the temperature of the SCR catalyst 9 increases. Further, the equilibrium adsorption amount increases as the equivalent ratio increases. Hence, when the temperature of the SCR catalyst 9 and the equivalent ratio remain constant continuously for a certain amount of time, or in other words when it is assumed that the amount of ammonia adsorbed on the SCR catalyst 9 has reached the equilibrium adsorption amount, the ammonia adsorption amount Qam of the SCR catalyst 9 can be calculated on the basis of the temperature of the SCR catalyst 9 and the equivalent ratio.

Next, in step S105, a desorption amount Qdeam is calculated. The desorption amount Qdeam increases as the temperature of the SCR catalyst 9 increases and as the amount of ammonia adsorbed on the SCR catalyst 9 increases. Therefore, the desorption amount Qdeam may be calculated on the basis of the temperature of the SCR catalyst 9 and the amount of ammonia adsorbed on the SCR catalyst 9.

Further, when it is assumed that the surplus adsorption amount and the desorption amount are in equilibrium, the desorption amount Qdeam can be calculated by determining the surplus adsorption amount. The surplus adsorption amount can be calculated by subtracting the reduction consumption amount Qcoam from the amount of ammonia supplied per unit time.

Next, in step S106, a determination is made as to whether or not the ammonia adsorption amount Qam of the SCR catalyst 9 at the current time, calculated in step S104, is equal to a target adsorption amount Qamt. Here, the target adsorption amount Qamt is determined in advance on the basis of experiments and the like as a value at which a target $NO_x$ purification ratio can be achieved and an amount of ammonia flowing out of the SCR catalyst 9 does not exceed an upper limit value. The target adsorption amount Qamt may also be determined in accordance with the temperature of the SCR catalyst 9. Note that in step S106, an affirmative determination may be made as long as the value of the ammonia adsorption amount Qam is within a predetermined range having the target adsorption amount Qamt as a reference value.

When the determination of step S106 is affirmative, processing of step S108 is executed. In step S108, an adsorption amount manipulated variable Qh is set at an identical amount to the desorption amount Qdeam calculated in step S105. Next, in step S111, the ammonia addition amount is controlled to an amount obtained by adding the adsorption amount manipulated variable Qh to the reduction consumption amount Qcoam calculated in step S103.

When the determination of step S106 is negative, on the other hand, processing of step S107 is executed. In step S107, a determination is made as to whether or not the ammonia adsorption amount Qam of the SCR catalyst 9 at the current time, calculated in step S104, is smaller than the target adsorption amount Qamt.

When the determination of step S107 is affirmative, processing of step S109 is executed. In step S109, the adsorption amount manipulated variable Qh is set at a larger amount than the desorption amount Qdeam calculated in step S105. When, on the other hand, the determination of step S107 is negative, or in other words when the ammonia adsorption amount Qam of the SCR catalyst 9 at the current time, calculated in step S104, is larger than the target adsorption amount Qamt, processing of step S110 is executed. In step S110, the adsorption amount manipulated variable Qh is set at a smaller amount than the desorption amount Qdeam calculated in step S105. Following step S109 or step S110, the processing of step S111 is executed.

Note that in this embodiment, the ECU 20 that executes step S105 in the flow described above corresponds to a desorption amount calculation unit according to the present invention. Further, in this embodiment, the ECU 20 that executes steps S106 to S111 in the flow described above corresponds to a control unit according to the present invention.

(Second Embodiment)

An exhaust gas purification system for an internal combustion engine according to a second embodiment of the present invention will be described below with reference to FIGS. 5 and 6. Note that points shared with the first embodiment will not be described below.

[Control of Ammonia Addition Amount]

The intake/exhaust system of the internal combustion engine according to this embodiment is configured basically identically to the first embodiment. Furthermore, in this embodiment, similarly to the first embodiment, the ammonia addition amount is controlled in consideration of the desorption amount as well as the reduction consumption amount. In other words, the ammonia addition amount is controlled to an amount obtained by adding the adsorption amount manipulated variable to the reduction consumption amount.

As described above, the desorption amount increases as the temperature of the SCR catalyst 9 increases. Therefore, in the ammonia addition amount control according to this embodiment, the adsorption amount manipulated variable is determined on the basis of the amount of ammonia adsorbed on the SCR catalyst 9 and the temperature of the SCR catalyst 9 without calculating the desorption amount itself. FIG. 5 is a view showing a relationship between the temperature of the SCR catalyst 9 and a reference adsorption amount manipulated variable in the ammonia addition amount control according to this embodiment. Here, the reference adsorption amount manipulated variable is an adsorption amount manipulated variable obtained when the amount of ammonia adsorbed on the SCR catalyst 9 has reached the target adsorption amount and the ammonia adsorption amount is held at the target adsorption amount.

Figure 5:
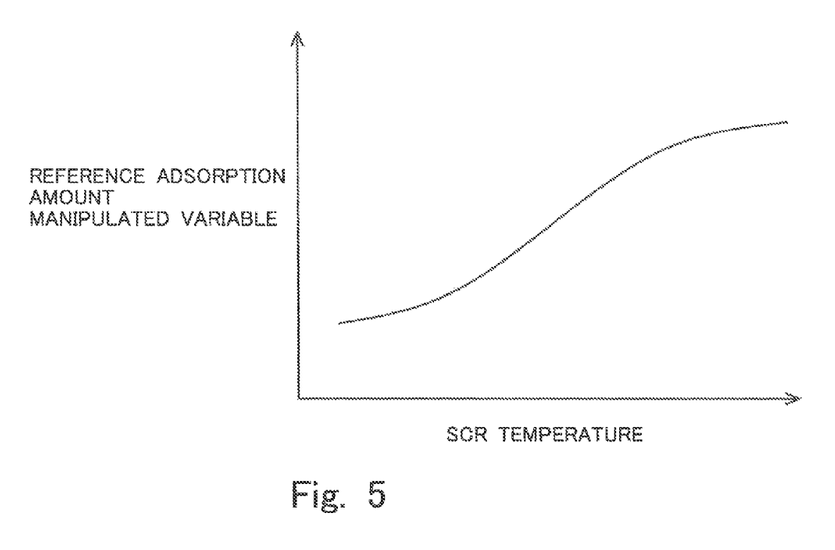
FIG. 5 is a view showing a relationship between the temperature of the SCR catalyst and a reference adsorption amount manipulated variable during ammonia addition amount control according to a second embodiment.
Figure 6:
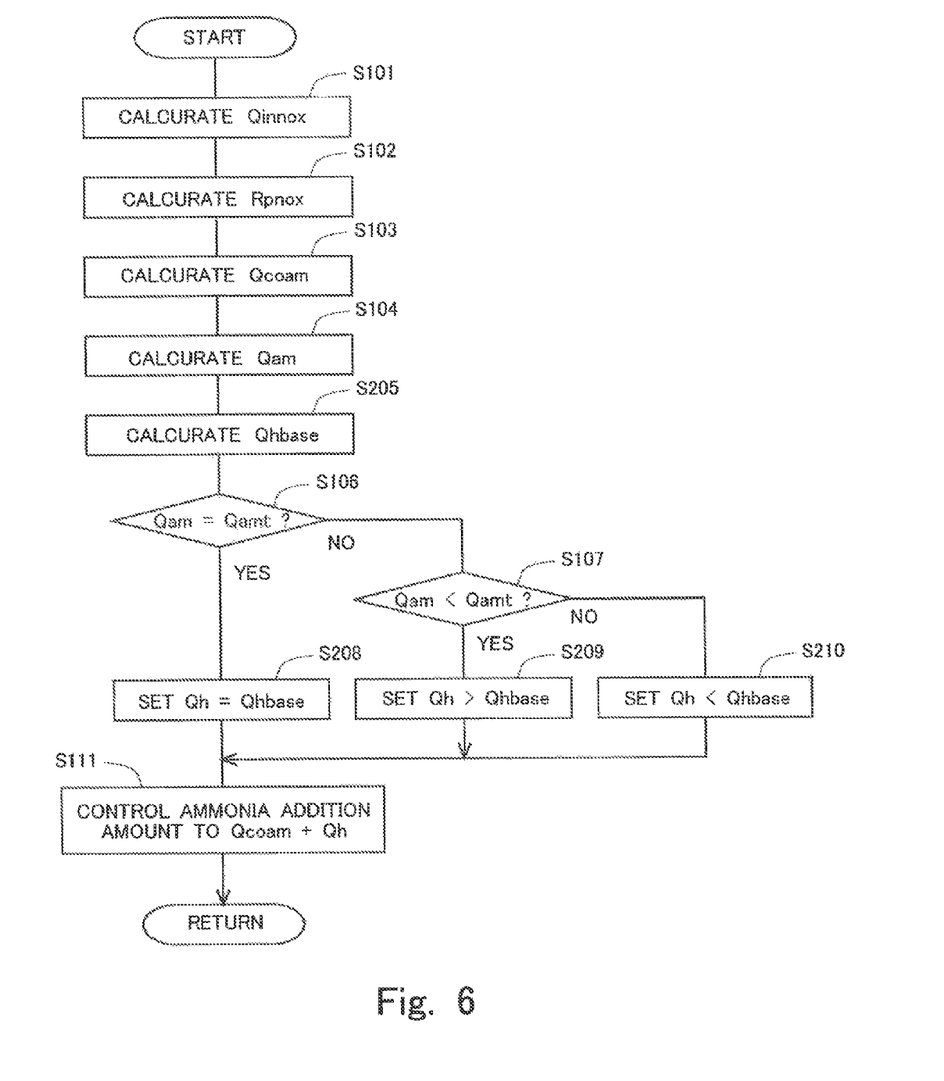
FIG. 6 is a flowchart showing a flow of the ammonia addition amount control according to the second embodiment.

As shown in FIG. 5, in this embodiment, when the amount of ammonia adsorbed on the SCR catalyst 9 is held at the target adsorption amount, the reference adsorption amount manipulated variable is set larger value as the temperature of the SCR catalyst 9 becomes higher, even while the ammonia adsorption amount remains constant. In so doing, the ammonia addition amount can be increased as the desorption amount increases. In other words, the supply amount supplied to the SCR catalyst 9 per unit time can be increased as the desorption amount increases. As a result, the amount of ammonia adsorbed on the SCR catalyst 9 can be held at the target adsorption amount.

Note that in the ammonia addition amount control according to this embodiment, the adsorption amount manipulated variable is set at a larger amount than the reference adsorption amount manipulated variable when the amount of ammonia adsorbed on the SCR catalyst 9 is smaller than the target adsorption amount. In so doing, the amount of ammonia adsorbed on the SCR catalyst 9 can be increased toward the target adsorption amount. Further, when the amount of ammonia adsorbed on the SCR catalyst 9 is larger than the target adsorption amount, the adsorption amount manipulated variable is set at a smaller amount than the reference adsorption amount manipulated variable. In so doing, the amount of ammonia adsorbed on the SCR catalyst 9 can be reduced toward the target adsorption amount.

A flow of the ammonia addition amount control according to this embodiment will be described below on the basis of FIG. 6. FIG. 6 is a flowchart showing a flow of the ammonia addition amount control according to this embodiment. This flow is stored in the ECU 20 in advance, and executed repeatedly by the ECU 20. Note that in this flow, steps in which identical processing to the flow shown in FIG. 3 is executed have been allocated identical step numbers, and description thereof has been omitted.

In this flow, processing of step S205 is executed following step S104. In step S205, a reference adsorption amount manipulated variable Qhbase is calculated on the basis of the target adsorption amount and the temperature of the SCR catalyst 9. A relationship of the reference adsorption amount manipulated variable Qhbase to the target adsorption amount and the temperature of the SCR catalyst 9 is determined in advance on the basis of experiments and the like, and stored in the ECU 20 in the form of a map or a function. On the map or the function, a value of the reference adsorption amount manipulated variable Qhbase increases as the target adsorption amount increases. Further, as shown in FIG. 5, the value of the reference adsorption amount manipulated variable Qhbase increases as the temperature of the SCR catalyst 9 increases, even while the target adsorption amount remains constant.

When the determination of step S106 is affirmative, or in other words when the ammonia adsorption amount Qam of the SCR catalyst 9 is equal to the target adsorption amount Qamt, processing of step S208 is executed. In step S208, the adsorption amount manipulated variable Qh is set at the reference adsorption amount manipulated variable Qhbase calculated in step S205.

Next, in step S111, the ammonia addition amount is controlled to an amount obtained by adding the adsorption amount manipulated variable Qh to the reduction consumption amount Qcoam calculated in step S103. As a result, the ammonia adsorption amount Qam of the SCR catalyst 9 is held at the target adsorption amount Qamt.

Further, when the determination of step S107 is affirmative, or in other words when the ammonia adsorption amount Qam of the SCR catalyst 9 is smaller than the target adsorption amount Qamt, processing of step S209 is executed. In step S209, the adsorption amount manipulated variable Qh is set at a larger amount than the reference adsorption amount manipulated variable Qhbase calculated in step S205.

On the other hand, when the determination of step S107 is negative, or in other words when the ammonia adsorption amount Qam of the SCR catalyst 9 is larger than the target adsorption amount Qamt, processing of step S210 is executed. In step S210, the adsorption amount manipulated variable Qh is set at a smaller amount than the reference adsorption amount manipulated variable Qhbase calculated in step S205. Following step S209 or step S210, the processing of step Sill is executed. As a result, the ammonia adsorption amount Qam of the SCR catalyst 9 is increased or reduced toward the target adsorption amount Qamt.

Note that in this embodiment, the ECU 20 that executes steps S106, S208, and S111 of the flow described above corresponds to the control unit according to the present invention.

(Third Embodiment)

An exhaust gas purification system for an internal combustion engine according to a third embodiment of the present invention will be described below with reference to FIGS. 7 and 8. Note that points shared with the first embodiment will not be described below.

[Control of Ammonia Addition Amount]

The intake/exhaust system of the internal combustion engine according to this embodiment is configured basically identically to the first embodiment. Furthermore, in this embodiment, similarly to the first embodiment, the ammonia addition amount is controlled in consideration of the desorption amount as well as the reduction consumption amount. In other words, the ammonia addition amount is controlled to an amount obtained by adding the adsorption amount manipulated variable to the reduction consumption amount.

In the ammonia addition amount control according to this embodiment, the ammonia addition amount is controlled such that the equivalent ratio ($NH_3$ supply amount/inflowing $NO_x$ amount) reaches a desired value. Here, when the equivalent ratio is set to be constant regardless of the inflowing $NO_x$ amount and the inflowing $NO_x$ amount increases, the amount of ammonia supplied per unit time increases. Likewise in this case, a ratio of the reduction consumption amount and the surplus adsorption amount relative to the entire amount of reducing agent adsorbed to the SCR catalyst per unit time remains constant. Accordingly, the surplus adsorption amount itself increases. As a result, the amount of ammonia adsorbed on the SCR catalyst 9 increases by a larger amount.

Hence, in the exhaust gas purification system for an internal combustion engine according to this embodiment, a target equivalent ratio is modified in accordance with the inflowing $NO_x$ amount. The adsorption amount manipulated value is then determined on the basis of the target equivalent ratio. FIG. 7 is a view showing a relationship between the inflowing $NO_x$ amount and a reference target equivalent ratio used in the ammonia addition amount control according to this embodiment. Here, the reference target equivalent ratio is an equivalent ratio obtained when the amount of ammonia adsorbed on the SCR catalyst 9 has reached the target adsorption amount and the ammonia adsorption amount is held at the target adsorption amount. The reference adsorption amount manipulated value is set on the basis of the reference target equivalent ratio.

Figure 7:
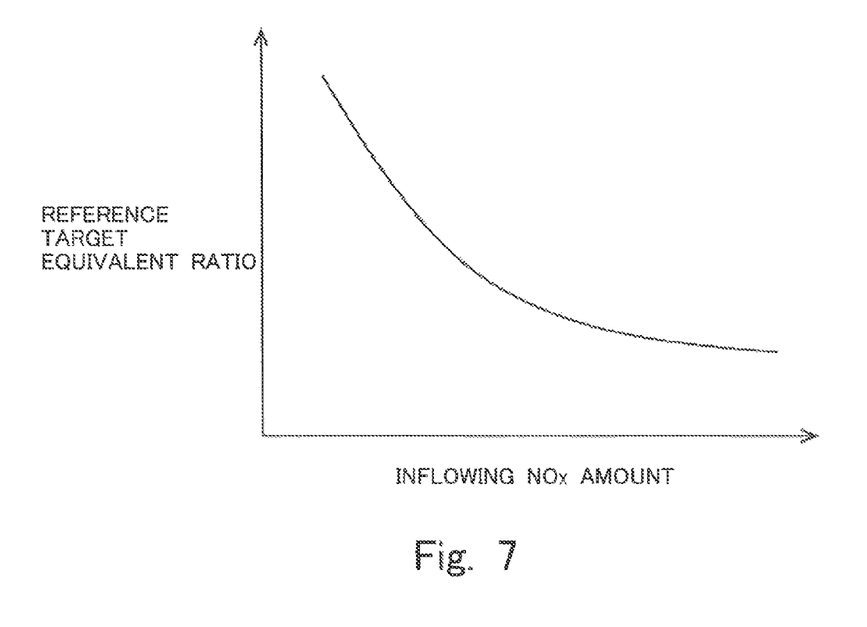
FIG. 7 is a view showing a relationship between the inflowing $NO_x$ amount and a reference target equivalent ratio during ammonia addition amount control according to a third embodiment.
Figure 8:
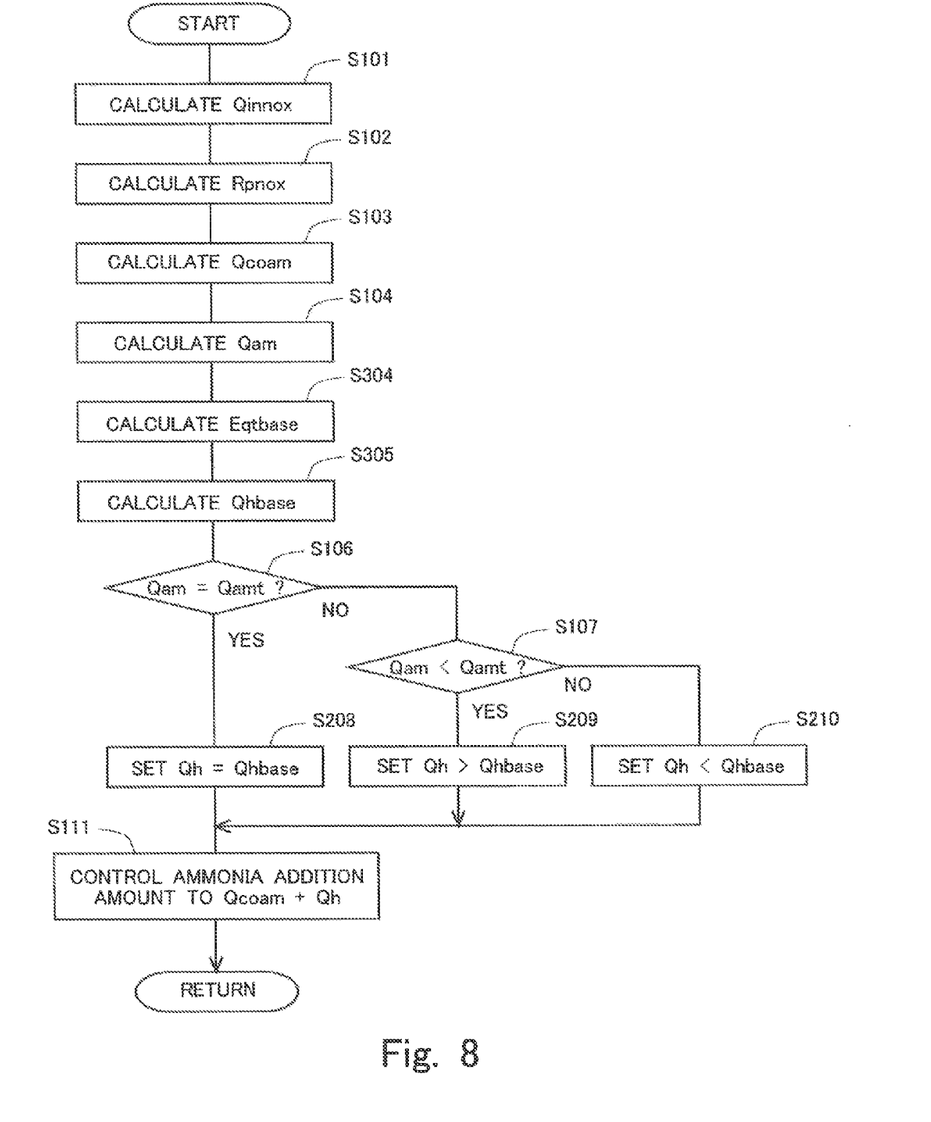
FIG. 8 is a flowchart showing a flow of the ammonia addition amount control according to the third embodiment.

In this embodiment, as shown in FIG. 7, when the amount of ammonia adsorbed on the SCR catalyst 9 is held at the target adsorption amount, the reference target equivalent ratio is set smaller value as the inflowing $NO_x$ amount becomes larger, even while the ammonia adsorption amount remains constant. In so doing, even when the inflowing $NO_x$ amount increases, an increase rate of the reference adsorption amount manipulated value is kept smaller than an increase rate of the inflowing $NO_x$ amount. In other words, an increase rate of the ammonia supply amount can be reduced. Accordingly, an excessive increase in the surplus adsorption amount can be suppressed, and as a result, the amount of ammonia adsorbed on the SCR catalyst 9 can be held at the target adsorption amount.

Note that likewise during the ammonia addition amount control according to this embodiment, when the amount of ammonia adsorbed on the SCR catalyst 9 is smaller than the target adsorption amount, the adsorption amount manipulated value is set at a larger amount than the reference adsorption amount manipulated value, similarly to the ammonia addition amount control according to the second embodiment. In so doing, the amount of ammonia adsorbed on the SCR catalyst 9 can be increased toward the target adsorption amount. Further, when the amount of ammonia adsorbed on the SCR catalyst 9 is larger than the target adsorption amount, the adsorption amount manipulated value is set at a smaller amount than the reference adsorption amount manipulated value. In so doing, the amount of ammonia adsorbed on the SCR catalyst 9 can be reduced toward the target adsorption amount.

A flow of the ammonia addition amount control according to this embodiment will be described below on the basis of FIG. 8. FIG. 8 is a flowchart showing a flow of the ammonia addition amount control according to this embodiment. This flow is stored in the ECU 20 in advance, and executed repeatedly by the ECU 20. Note that in this flow, steps in which identical processing to the flow shown in FIG. 6 is executed have been allocated identical step numbers, and description thereof has been omitted.

In this flow, processing of step S304 is executed following step S104. In step S304, a reference target equivalent ratio Eqtbase is calculated on the basis of the target adsorption amount and the inflowing $NO_x$ amount $Qinno_x$ calculated in step S101. A relationship of the reference target equivalent ratio Eqtbase to the target adsorption amount and the inflowing $NO_x$ amount $Qinno_x$ is determined in advance on the basis of experiments and the like, and stored in the ECU 20 in the form of a map or a function. On the map or the function, a value of the reference target equivalent ratio Eqtbase decreases as the target adsorption amount decreases. Further, as shown in FIG. 7, the value of the reference target equivalent ratio Eqtbase decreases as the inflowing $NO_x$ amount $Qinno_x$ increases, even while the target adsorption amount remains constant.

Next, in step S305, the reference adsorption amount manipulated variable Qhbase is calculated on the basis of the reference target equivalent ratio Eqtbase calculated in step S304 and the inflowing $NO_x$ amount $Qinno_x$.

When the reference adsorption amount manipulated variable Qhbase is determined in this manner, the determination of the following step S106 is affirmative, and therefore the adsorption amount manipulated variable Qh is set at the reference adsorption amount manipulated variable Qhbase in step S208. Next, in step S111, the ammonia addition amount is controlled to an amount obtained by adding the adsorption amount manipulated variable Qh to the reduction consumption amount Qcoam, and as a result, the equivalent ratio reaches the reference target equivalent ratio.

Note that in this embodiment, the ECU 20 that executes steps S106, S208, and S111 in the flow described above corresponds to the control unit according to the present invention.

The ammonia addition amount control according to the second embodiment may be applied to the ammonia addition amount control according to this embodiment. In other words, likewise in the ammonia addition amount control according to this embodiment, the reference target equivalent ratio Eqtbase may be increased as the temperature of the SCR catalyst 9 increases so that the reference adsorption amount manipulated variable Qhbase increases as the temperature of the SCR catalyst 9 increases.

DESCRIPTION OF THE REFERENCE SIGNS

1 internal combustion engine
2 intake passage
3 exhaust passage
7 oxidation catalyst
8 filter
9 selective reduction type $NO_x$ catalyst (SCR catalyst)
10 ammonia slip catalyst
11 addition valve
12 first $NO_x$ sensor
13 exhaust gas temperature sensor
14 second $NO_x$ sensor

The invention claimed is:

1. An exhaust gas purification system for an internal combustion engine, comprising:
   a selective reduction type $NO_x$ catalyst provided in an exhaust passage of the internal combustion engine which selectively reduces $NO_x$ contained in exhaust gas when a reducing agent is supplied thereto;
   a supply apparatus that supplies the reducing agent to the selective reduction type $NO_x$ catalyst; and
   a controller configured to:
      calculated a reduction consumption amount, which is an amount of the reducing agent consumed per unit time by the selective reduction type $NO_x$ catalyst for reduction of the $NO_x$;
      calculate a desorption anount, which is an amount of the reducing agent, from amoung the reducing agent adsorbed to the selective reduction type $NO_x$ catalyst per unit time without being consumed for reduction of the $NO_x$; and
      when a reducing agent adsorption amount adsorbed on the selective reduction type $NO_x$ catalyst is held at a target adsorption amount, control the supply apparatus such that a reducing agent supply amount supplied from the supply apparatus per unit time to an amount obtained by adding the calculated reduction consumption amount and the calculated desorption amount.

2. The exhaust gas purification system for an internal combustion engine according to claim 1, wherein the controller is configured to control the supply apparatus such that the reducing agent supply amount supplied from the supply apparatus per unit time to an amount obtained by adding a larger amount than the desorption amount to the reduction consumption amount when the reducing agent adsorption amount adsorbed to the selective reduction type $NO_x$ catalyst is smaller than the target adsorption amount, and control the supply apparatus such that the reducing agent supply amount supplied from the supply apparatus per unit time to an amount obtained by adding a smaller amount than the desorption amount to the reduction consumption amount when the reducing agent adsorption amount adsorbed to the selective reduction type $NO_x$ catalyst is larger than the target adsorption amount.

3. An exhaust gas purification system for an internal combustion engine, comprising:
- a selective reduction type $NO_x$ catalyst provided in an exhaust passage of the internal combustion engine which selectively reduces $NO_x$ contained in exhaust gas when a reducing agent is supplied thereto;
- a supply apparatus that supplies the reducing agent to the selective reduction type $NO_x$ catalyst; and
- a controller configured to:
  - calculate a reduction consumption amount, which is an amount of the reducing agent amount consumed per unit time by the selective reduction type $NO_x$ catalyst for reduction of the $NO_x$; and
  - when a reducing agent adsorption amount adsorbed on the selective reduction type $NO_x$ catalyst is held at a target adsorption amount, control the supply apparatus such that a reducing agent supply amount supplied from the supply apparatus per unit time to an amount obtained by adding the calculated reduction consumption amount and a correction amount;
- wherein the controller is configured to calculate the correction amount such that the correction amount becomes larger as a temperature of the selective reduction type $NO_x$ catalyst becomes higher.

4. An exhaust gas purification system for an internal combustion engine, comprising:
- a selective reduction type $NO_x$ catalyst provided in an exhaust passage of the internal combustion engine which selectively reduces $NO_x$ contained in exhaust gas when a reducing agent is supplied thereto;
- a supply apparatus that supplies the reducing agent to the elective reduction type $NO_x$ catalyst; and
- a controller configured to:
  - calculate a reduction consumption amount, which is an amount of the reducing agent amount consumed per unit time by the selective reduction type $NO_x$ catalyst for reduction of the $NO_x$; and
  - when a reducing agent adsorption amount adsorbed on the selective reduction type $NO_x$ catalyst is held at a target adsorption amount, control the supply apparatus such that a reducing agent supply amount supplied from the supply apparatus per unit time to an amount obtained by adding the calculated reduction consumption amount and a correction amount;
- wherein the controller is configured to calculate the correction amount such that a ratio of the reducing agent supply amount supplied from the supply apparatus per unit time relative to an inflowing $NO_x$ amount, which is an amount of $NO_x$ flowing into the selective reduction type $NO_x$ catalyst per unit time, decreases as the inflowing $NO_x$ amount becomes larger.

* * * * *